United States Patent [19]
Crowder

[11] 3,805,743
[45] Apr. 23, 1974

[54] POULTRY CONVEYOR MEANS

[76] Inventor: Delphin F. Crowder, 220 Stapleton Dr., Prairie Grove, Ark. 72753

[22] Filed: Feb. 17, 1972

[21] Appl. No.: 227,062

[52] U.S. Cl. .................................. 119/82, 198/165
[51] Int. Cl. ............................................. A01k 29/00
[58] Field of Search ................. 119/82; 198/39, 165

[56] References Cited
UNITED STATES PATENTS

| | | | |
|---|---|---|---|
| 3,110,388 | 11/1963 | Elliott et al. ........................ | 119/82 X |
| 3,203,534 | 8/1965 | Burkhardt et al. ................... | 198/165 |
| 3,446,332 | 5/1969 | Bechtloff ............................ | 198/165 |
| 3,513,921 | 5/1970 | Refer et al. ........................ | 198/39 X |
| 3,545,588 | 12/1970 | Corley et al. ....................... | 198/39 X |
| 2,809,741 | 10/1957 | Keilig ................................ | 198/165 X |
| 3,420,211 | 1/1969 | Hartwickson ........................ | 119/82 |
| 3,452,718 | 7/1969 | Wight ................................ | 119/82 |
| 3,638,743 | 2/1972 | Douglas ............................. | 198/39 X |

*Primary Examiner*—James H. Czerwonky
*Attorney, Agent, or Firm*—Zarley, McKee & Thomte

[57] ABSTRACT

A poultry conveyor means is disclosed herein and comprises a first conveyor means which is located in the poultry house for conveying the poultry outwardly therefrom. A second conveyor means is in communication with the first conveyor means for conveying the poultry upwardly to a poultry truck. Means is also provided for preventing injury to the poultry as they are being conveyed. A flexible sack is provided at the upper outer end of the second conveyor means for aiding in depositing the chickens in the coops placed on a truck. Transparent conveyor cover means is provided to permit viewing of the poultry being conveyed.

5 Claims, 3 Drawing Figures

POULTRY CONVEYOR MEANS

Many attempts have been made to provide a convenient means for loading poultry such as chickens or the like onto trucks having chicken coops thereon. In all of the systems presently available, the chickens are either injured during the loading operation or the loading operation is so inefficient that valuable time and money is wasted.

Therefore, it is a principal object of this invention to provide a poultry conveyor means.

A further object of this invention is to provide a poultry conveyor means which has means thereon for preventing injury to the poultry.

A further object of this invention is to provide a poultry conveyor means especially well adapted for use with chickens.

A further object of this invention is to provide a poultry conveyor means having means thereon for counting, weighing and marking the poultry as they are moved on the conveyor means.

A further object of this invention is to provide a poultry conveyor means having a transparent top portion which permits the poultry to be viewed during the conveying of the same.

A further object of this invention is to provide a poultry conveyor means including a first conveyor means located within the poultry house itself.

A further object of this invention is to provide a poultry conveyor means for conveying poultry from a poultry house to a truck having poultry coops thereon.

A further object of this invention is to provide a poultry conveyor means which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

Figure 1:
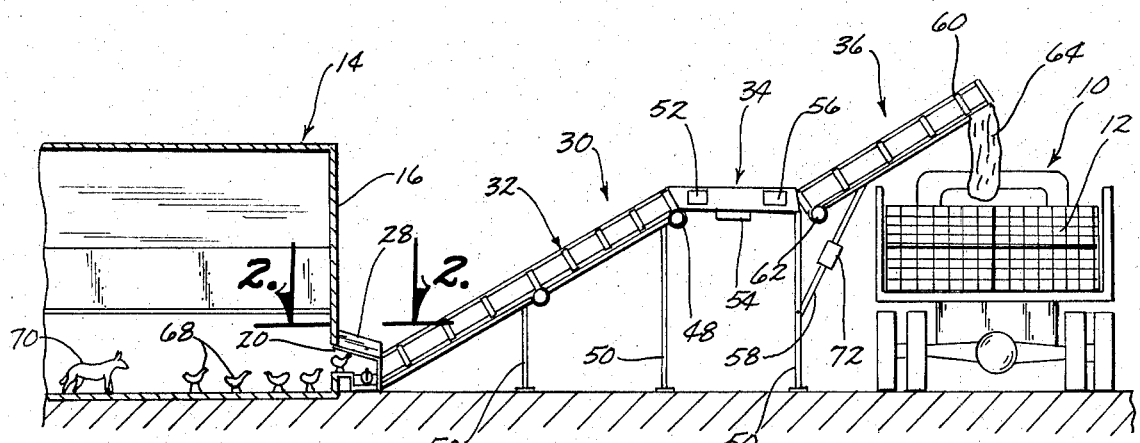
FIG. 1 is a side view illustrating the conveyor means of this invention.

In FIG. 1, the numeral 10 refers generally to a conventional poultry or chicken truck having chicken coops 12 thereon. The numeral 14 refers to a poultry or chicken house having a side wall 16 at one side thereof.

A conveyor means 18 is provided along the entire length of the side wall 16 and is communication with the interior of the poultry house 14 by means of access opening 20. The conveyor means 18 comprises a bottom belt conveyor 22 of the endless type and spaced apart side conveyor belts 24 and 26 which are also of the endless type. The conveyor belts 22, 24 and 26 are mounted on suitable shafts and operate in the direction illustrated by the arrow in FIG. 2. A clear transparent sheet 28 extends over the upper end of the conveyor means 18 to permit the poultry to be observed during their travel on the conveyor means.

Figure 2:
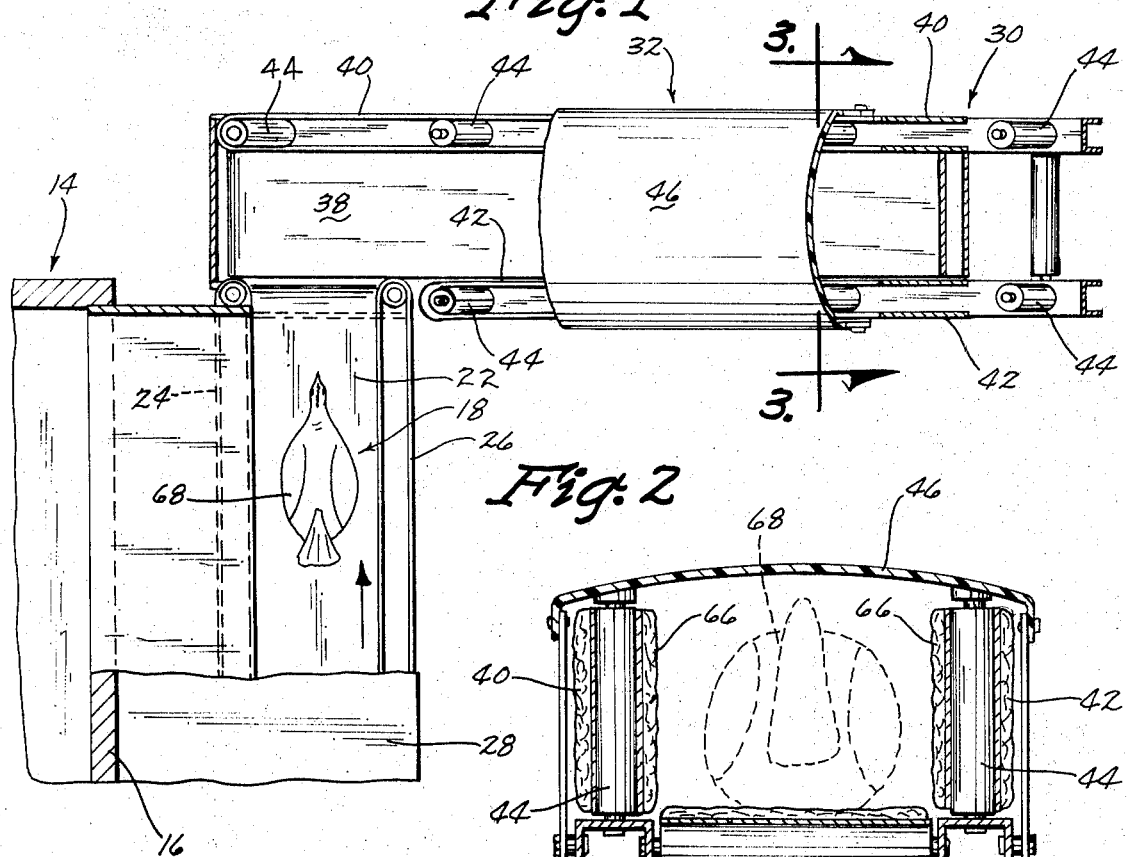
FIG. 2 is an enlarged sectional view seen along lines 2—2 of FIG. 1.
Figure 3:
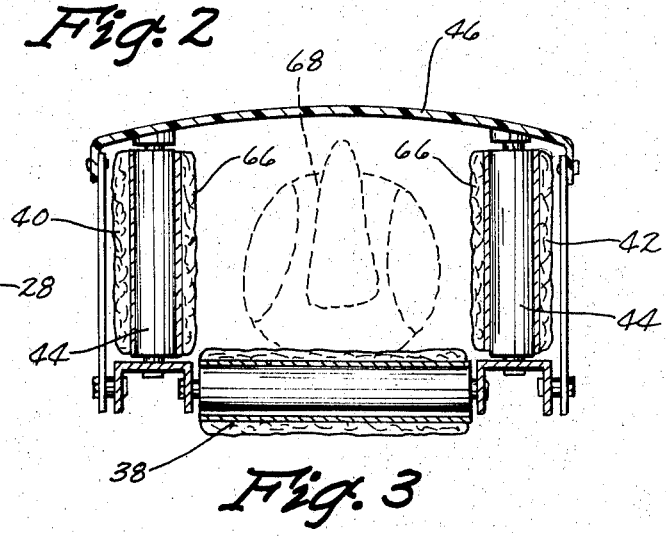
FIG. 3 is an enlarged sectional view seen along lines 3—3 of FIG. 2.

The numeral 30 refers generally to a conveyor means positioned outside of the poultry coop 14 and generally comprising conveyor portions 32, 34 and 36. As seen in FIG. 2, conveyor portion 32 is in communication at its lower end with the end of the conveyor means 18. Conveyor portion 32 includes a bottom conveyor belt 38 and spaced apart side conveyor belts 40 and 42. Suitable conveyor rollers 44 are provided for supporting the belts. A clear transparent sheet 46 extends over the conveyor portion 32 to permit the poultry to be viewed during the time that they are traveling on the conveyor portion 32. A motor 48 is operatively connected to the conveyor belts 38, 40 and 42 for driving the same in the direction of the arrow of FIG. 2. As seen in FIG. 1, the conveyor portion 32 is supported by supporting legs 50.

The upper end of conveyor portion 32 is in communication with the conveyor portion 34 which also has a bottom and spaced apart side conveyor belts. A conventional poultry counter 52 is provided on the conveyor portion 34 for counting the chickens or poultry as they pass therethrough. Conventional rotating scales 54 are also provided on the conveyor portion 34 for weighing the chickens as they pass thereover. Further, a conventional marker means 56 is provided on the conveyor portion 34 for marking or stamping the weight of the poultry thereon after they have been weighed.

Conveyor portion 36 is adjustably movably secured to one end of the conveyor portion 34 by means of brace 58. The conveyor portion 36 also has a bottom conveyor belt and spaced apart side conveyor belts with a clear transparent sheet member 60 extending over the upper portion thereof. A motor 62 is provided for operating the conveyor portion 36 and the conveyor portion 34. A flexible chute or sack member 64 is provided at the outer end of the conveyor portion 36 to permit the truck driver to drop the chickens downwardly into the proper coop on the truck. A hydraulic motor 72 is provided on brace 58, which is telescopic, to raise and lower the upper end of conveyor portion 36. The motor 72 would be controlled by a suitable control box at the upper end of conveyor portion 36 to permit the men on the truck to control the same.

All of the conveyor portions or conveyor belts have a soft carpeting material provided thereon with the material being generally indicated by the reference numeral 66. The carpet material 66 is secured to the belts by means of adhesive or the like.

When it is desired to load the chickens 68 onto the truck 10, it is simply necessary to herd the chickens through the opening 20 onto the conveyor means 18. The chickens may be herded onto the conveyor through the use of a dog 70 or the like. The moving conveyor means 18 conveys the chickens to the conveyor portion 32 which conveys the chickens upwardly onto the conveyor portion 34 where they are counted, weighed and marked. The counted, weighed and marked chickens are then conveyed upwardly through the conveyor portion 36 and dropped downwardly into the coops through the use of the chute 64. It can be seen that a convenient means has been provided for loading the chickens onto the trucks which involves a minimum amount of associated labor. The fact that the side walls of the conveyors as well as the bottoms are moving prevents injury to the chickens as they are being conveyed as does the carpet material 66 provided thereon.

Thus it can be seen that an improved poultry conveyor means has been provided which accomplishes at least all of its stated objectives.

I claim:

1. In combination, a poultry house, a first conveyor means in said house for conveying the poultry outwardly therefrom, a second conveyor means in communication with said first conveyor means for conveying the poultry upwardly to a poultry truck, and padding means mounted on at least said second conveyor means for preventing injury to the poultry as they are being conveyed.

2. The combination of claim 1 wherein a clear transparent top sheet member extends across the upper ends of and is mounted on, said first and second conveyor belts to permit the poultry to be viewed as they are being conveyed.

3. In combination, a poultry house, a first conveyor means in said house for conveying the poultry outwardly therefrom, a second conveyor means in communication with said first conveyor means for conveying the poultry upwardly to a poultry truck, means on at least said second conveyor means for preventing injury to the poultry as they are being conveyed, and said means on said second conveyor means for preventing injury to the poultry comprising a carpet material secured to and movable with said second conveyor means.

4. In combination, a poultry house, a first conveyor means in said house for conveying the poultry outwardly therefrom, a second conveyor means in communication with said first conveyor means for conveying the poultry upwardly to a poultry truck, means on at least said second conveyor means for preventing injury to the poultry as they are being conveyed, and an elongated flexible chute means mounted on the outer end of said second conveyor means and which extends downwardly therefrom.

5. The combination of claim 1 wherein said second conveyor means comprises a bottom conveyor belt having a top surface and first and second spaced apart conveyor belts mounted on said second conveyor means and extending upwardly from opposite sides of said bottom conveyor belt, said first and second spaced apart conveyor belts having lower ends which are parallel to said top surface of said bottom conveyor belt.

* * * * *